(12) United States Patent
Luan et al.

(10) Patent No.: US 12,214,300 B2
(45) Date of Patent: Feb. 4, 2025

(54) SEDIMENTATION PLATE, SEDIMENTATION ASSEMBLY, AND SEDIMENTATION MODULE

(71) Applicant: SHANDONG HOTONE ENVIRONMENTAL TECHNOLOGY CO., LTD., Weifang (CN)

(72) Inventors: Haofeng Luan, Weifang (CN); Shilian Mao, Weifang (CN); Jianmeng Du, Weifang (CN)

(73) Assignee: SHANDONG HOTONE ENVIRONMENTAL TECHNOLOGY CO., LTD., Weifang (CN)

( * ) Notice: Subject to any disclaimer, the term of this patent is extended or adjusted under 35 U.S.C. 154(b) by 0 days.

(21) Appl. No.: 18/701,665

(22) PCT Filed: Oct. 17, 2022

(86) PCT No.: PCT/CN2022/125788
§ 371 (c)(1),
(2) Date: Apr. 16, 2024

(87) PCT Pub. No.: WO2023/066218
PCT Pub. Date: Apr. 27, 2023

(65) Prior Publication Data
US 2024/0325944 A1 Oct. 3, 2024

(30) Foreign Application Priority Data
Oct. 18, 2021 (CN) .......................... 202111210735.3
Dec. 22, 2021 (CN) .......................... 202111583428.X (51) Int. Cl.
*B01D 21/00* (2006.01)
*B01D 21/24* (2006.01)

(52) U.S. Cl.
CPC ..... *B01D 21/0075* (2013.01); *B01D 21/0003* (2013.01); *B01D 21/0042* (2013.01);
(Continued)

(58) Field of Classification Search
CPC ............ B01D 21/0075; B01D 21/0042; B01D 21/0045; B01D 21/0003; B01D 21/2416; B01D 21/2472
See application file for complete search history.

(56) References Cited

U.S. PATENT DOCUMENTS 3,491,892 A * 1/1970 McCann ............ B01D 21/0069
210/521
3,615,025 A * 10/1971 Rice .................. B01D 21/0051
210/208
(Continued)

FOREIGN PATENT DOCUMENTS

CN 101190389 A 6/2008
CN 201370979 Y 12/2009
(Continued)

*Primary Examiner* — Bradley R Spies
*Assistant Examiner* — Jeannie McDermott
(74) *Attorney, Agent, or Firm* — Bayramoglu Law Offices LLC (57) ABSTRACT

A sedimentation plate, a sedimentation assembly, and a sedimentation module are provided. The sedimentation plate includes a flat plate; a plurality of first rib plates arranged at intervals, parallel to each other, and perpendicular to a first surface of the flat plate; and a plurality of second rib plates arranged at intervals, parallel to each other, and perpendicular to a second surface of the flat plate. The first rib plates are perpendicular to the second rib plates. A water channel is formed between each two adjacent first rib plates. A mud channel is formed between each two adjacent second rib
(Continued)

plates. The sedimentation assembly includes a plurality of sedimentation plates. The sedimentation module includes the sedimentation assembly.

19 Claims, 7 Drawing Sheets

(52) U.S. Cl.
CPC ..... B01D 21/0045 (2013.01); B01D 21/0048 (2013.01); B01D 21/2416 (2013.01); B01D 21/2472 (2013.01)

(56) References Cited

U.S. PATENT DOCUMENTS

| | | | | |
|---|---|---|---|---|
| 3,898,164 | A | * | 8/1975 | Hsiung .............. B01D 21/0063 210/521 |
| 5,736,037 | A | * | 4/1998 | Meurer .............. B01D 21/0051 210/232 |
| 2004/0149648 | A1 | | 8/2004 | Donnick et al. |

FOREIGN PATENT DOCUMENTS

| | | |
|---|---|---|
| CN | 105617725 A | 6/2016 |
| CN | 106215469 A | 12/2016 |
| CN | 106310728 A | 1/2017 |
| CN | 106943776 A | 7/2017 |
| CN | 110711409 A | 1/2020 |
| CN | 112426756 A | 3/2021 |
| CN | 213555521 U | 6/2021 |
| CN | 113750579 A | 12/2021 |
| CN | 114405073 A | 4/2022 |
| CN | 216798810 U | 6/2022 |
| KR | 102295811 B1 | 8/2021 |
| WO | 2012167486 A1 | 12/2012 |
| WO | 2014128052 A1 | 8/2014 |

* cited by examiner

FIG. 8 ial Application No. PCT/CN2022/125788, filed on Oct. 17, 2022, which is based upon and claims priority to Chinese Patent Applications No. 202111210735.3, filed on Oct. 18, 2021, and No. 202111583428.X, filed on Dec. 22, 2021, the entire contents of which are incorporated herein by reference.

SEDIMENTATION PLATE, SEDIMENTATION ASSEMBLY, AND SEDIMENTATION MODULE

CROSS REFERENCE TO THE RELATED APPLICATIONS

This application is the national phase entry of International Application No. PCT/CN2022/125788, filed on Oct. 17, 2022, which is based upon and claims priority to Chinese Patent Applications No. 202111210735.3, filed on Oct. 18, 2021, and No. 202111583428.X, filed on Dec. 22, 2021, the entire contents of which are incorporated herein by reference.

TECHNICAL FIELD

The present disclosure relates to the field of water treatment, and in particular to a sedimentation plate, a sedimentation assembly, and a sedimentation module.

BACKGROUND

As a conventional process in the water treatment industry, the lateral flow inclined-plate sedimentation process conforms to the "shallow pool theory" due to the inclined plates that are usually 25-200 mm spaced. The lateral flow inclined-plate sedimentation process achieves high settling efficiency, as well as high effective utilization (at least 90%) of the cross-section perpendicular to the water flow.

However, in this process, when the inclined plate with a width greater than 1 m and a thickness less than 10 mm is at an angle of 60° to the horizontal plane, the inclined plate will bend, and creep after long-term use, affecting the sediment discharge effect. In order to effectively utilize the height, large water plants usually adopt multi-stage bending arrangement of inclined plates. However, during the sediment discharge process, when the sediment from an upper side slides downwards, it cannot fully fit at the corner position, but disperses and falls into water, thereby reducing the settling efficiency. In addition, the installation and fixation of the inclined plates are difficult. Due to the above defects, the lateral flow inclined-plate sedimentation process has not been widely promoted.

The lateral flow horizontal-pipe sedimentation process also has been applied in the water treatment industry for many years. Compared to the lateral flow inclined-plate sedimentation process, the lateral flow horizontal-pipe sedimentation process can cut the water body to a smaller scale, and the water channel and mud channel are independent of each other. Therefore, the lateral flow horizontal-pipe sedimentation process can achieve higher settling efficiency than the lateral flow inclined-plate sedimentation process. However, the corner of the traditional horizontal pipe and the main inclined plate are in a diamond, rather than perpendicular, structure. As a result, the mass manufacturing process faces the problem of difficult withdrawal, while the manual manufacturing process faces poor quality and high cost. In addition, since the water channel and the mud channel are separated, the effective utilization of the area on the cross-section perpendicular to the water flow is only about 60%. Due to the above defects, the lateral flow horizontal-pipe sedimentation process also has not been widely promoted.

SUMMARY

In order to solve the above technical problems, an objective of the present disclosure is to provide a sedimentation plate, a sedimentation assembly, and a sedimentation module.

In order to achieve the above objective, the present disclosure provides a sedimentation plate, including: a flat plate; a plurality of first rib plates, arranged at intervals, parallel to each other, and perpendicular to a first surface of the flat plate; and a plurality of second rib plates, arranged at intervals, parallel to each other, and perpendicular to a second surface of the flat plate; where, the first rib plates are perpendicular to the second rib plates; a water channel is formed between each two adjacent first rib plates; and a mud channel is formed between each two adjacent second rib plates.

Optionally, a height ratio of the first rib plate to the second rib plate is 1.5-5.

Optionally, the sedimentation plate is made of polyolefin.

Optionally, an interval between each two adjacent first rib plates is smaller than an interval between each two adjacent second rib plates.

Optionally, the second surface further protrudes to form a reinforcing rib that extends parallel to the second rib plate; and a height of the reinforcing rib is less than a height of the second rib plate.

Based on the technical solution, the present disclosure further provides a sedimentation assembly, including a box-type frame defined by a plurality of side beams and a plurality of sedimentation plates obliquely standing inside the box-type frame, where the sedimentation plate is the sedimentation plate described in the above technical solution; the first surface faces obliquely downward, and the second surface faces obliquely upward; and for each two adjacent sedimentation plates, the first rib plate of one sedimentation plate abuts against the second rib plate of the other sedimentation plate.

Optionally, an angle between the flat plate and a bottom surface of the box-type frame is 60°.

Optionally, at least one of the side beams is provided with a groove with an opening inclined to the bottom surface of the box-type frame; and the sedimentation plate is tightly inserted into the groove.

Optionally, the side beams are detachably connected by threaded fasteners.

Optionally, the sedimentation assembly further includes a flushing mechanism for injecting a flushing liquid into the mud channel; the flushing mechanism includes a bracket fixed above the side beams and a plurality of first flushing pipes installed on the bracket; and the first flushing pipes are horizontally arranged and provided with first water spray ports opening downward.

Optionally, the flushing mechanism further includes a plurality of second flushing pipes communicated with the first flushing pipes; and the plurality of second flushing pipes are erected on a side of the box-type frame and provided with second water spray ports facing the sedimentation plate.

Optionally, a plurality of second flushing pipes are erected on the side of the box-type frame adjacent to an upper end of the sedimentation plate.

Based on the technical solution, the present disclosure further provides a sedimentation module, including: a housing, provided with a water inlet, a water outlet, and a mud outlet; a sedimentation assembly, constructed as the sedimentation assembly described in the above technical solution, and provided inside the housing; and a sediment handling mechanism, provided below the sedimentation assembly to discharge settled sediment through the mud outlet.

Optionally, the sedimentation module further includes a water distribution mechanism, where the water distribution mechanism includes a first water distribution plate provided between a water input side of the sedimentation assembly and the water inlet and a second water distribution plate provided between a water output side of the sedimentation assembly and the water outlet; the first water distribution plate and the second water distribution plate divide the housing into a water input chamber, a sedimentation chamber accommodating the sedimentation assembly, and a water output chamber; and water distribution pipes are uniformly distributed on the first water distribution plate and the second water distribution plate in a penetrating manner to connect two adjacent chambers.

Optionally, each of the first water distribution plate and the second water distribution plate is a hollow plate with a cavity; a surface of each of the first water distribution plate and the second water distribution plate facing the water channel is provided with a plurality of nozzles communicated with the cavity; positions of the nozzles correspond to a position of the water channel; and the first water distribution plate and the second water distribution plate are connected to a water supply pipe for supplying water to the cavity.

In the above technical solution of the present disclosure, the plurality of first rib plates and the plurality of second rib plates of the sedimentation plate are perpendicular to the flat plate. The first rib plates and the second rib plates can act as reinforcing ribs, which increase the rigidity of the sedimentation plate while reducing the thickness of the sedimentation plate. The also design reduces the difficulty of withdrawing during the production of the sedimentation plate, thereby improving production efficiency and reducing production costs. When a plurality of sedimentation plates are inclined and stacked in sequence, the mud channel of each sedimentation plate faces obliquely upward and the water channel thereof faces obliquely downward. The first rib plates on the upper sedimentation plate are perpendicular to the mud channel of the lower sedimentation plate. Therefore, along a sedimentation direction of sediment, the first rib plates avoid blocking the mud channel. The design facilitates direct and rapid sedimentation of the sediment into the mud channel, thereby improving settling efficiency and increasing the utilization of the water flow cross-section of the water channel. In addition, as for the mud channel, the second rib plates stop in the water flow direction to prevent the sediment settled into the mud channel from re-entering the water flow, thereby improving the separation rate between the sediment and water. The sedimentation assembly of the present disclosure has the same technical effect as the sedimentation plate in the above technical solution, which is not described here to avoid unnecessary repetition. The sedimentation module provided by the present disclosure has the same technical effects as the sedimentation assembly in the above technical solution, which is not described here to avoid unnecessary repetition. In addition, the sediment discharged from the mud channel to the bottom of the housing is quickly discharged through the mud outlet under the guidance of the sediment handling mechanism, preventing the sediment from accumulating in the housing to clog the mud channel.

Other features and advantages of the present disclosure are described in detail in the following DETAILED DESCRIPTION OF THE EMBODIMENTS part.

BRIEF DESCRIPTION OF THE DRAWINGS

The drawings are provided for further understanding of the present disclosure, and constitute part of the specification. The drawings and the following specific implementations of the present disclosure are intended to explain the present disclosure, rather than to limit the present disclosure. Figures.

REFERENCE NUMERALS 1. sedimentation assembly; 10. sedimentation plate; 101. flat plate; 1011. first surface; 1012. second surface; 102. first rib plate; 103. second rib plate; 104. water channel; 105. mud channel; 106. reinforcing rib; 11. box-type frame; 111. side beam; 12. flushing mechanism; 121. bracket; 122. first flushing pipe; 123. first water spray port; 124. second flushing pipe; 125. second water spray port; 2. housing; 21. water inlet; 22. water outlet; 23. mud outlet; 201. water input chamber; 202. sedimentation chamber; 203. water output chamber; 3. sediment handling mechanism; 31. mud guide plate; 4. water distribution mechanism; 41. first water distribution plate; 42. second water distribution plate; 43. water distribution pipe; 44. nozzle; and 45. water supply pipe.

DETAILED DESCRIPTION OF THE EMBODIMENTS

The embodiments of the present disclosure are described below with reference to the drawings. It should be understood that the specific embodiments described herein are merely intended to illustrate and explain the present disclosure rather than to limit the present disclosure.

In the present disclosure, unless otherwise specified, the orientation terms such as "upper" and "lower" are usually intended to indicate upper and lower positions along the direction of gravity, while "inner" and "outer" indicate inner and outer positions relative to the contour of the part. In the present disclosure, the terms such as "first" and "second" are intended to distinguish one element from another and do not have order or importance. When the following descriptions relate to the drawings, unless otherwise stated, the same numerals in different drawings represent same or similar elements.

In order to achieve the above objective, the present disclosure provides sedimentation plate 10. As shown in FIGS. 1 to 4, the sedimentation plate 10 includes flat plate 101. The flat plate 101 includes first surface 1011 and second surface 1012 that are opposite to each other. A plurality of first rib plates 102 are arranged at intervals, parallel to each other, and perpendicular to the first surface 1011. A plurality of second rib plates 103 are arranged at intervals, parallel to each other, and perpendicular to the second surface 1012 of the flat plate 101. The first rib plates 102 are perpendicular to the second rib plates 103. Water channel 104 is formed between each two adjacent first rib plates 102, and mud channel 105 is formed between each two adjacent second rib plates 103.

Figure 1:
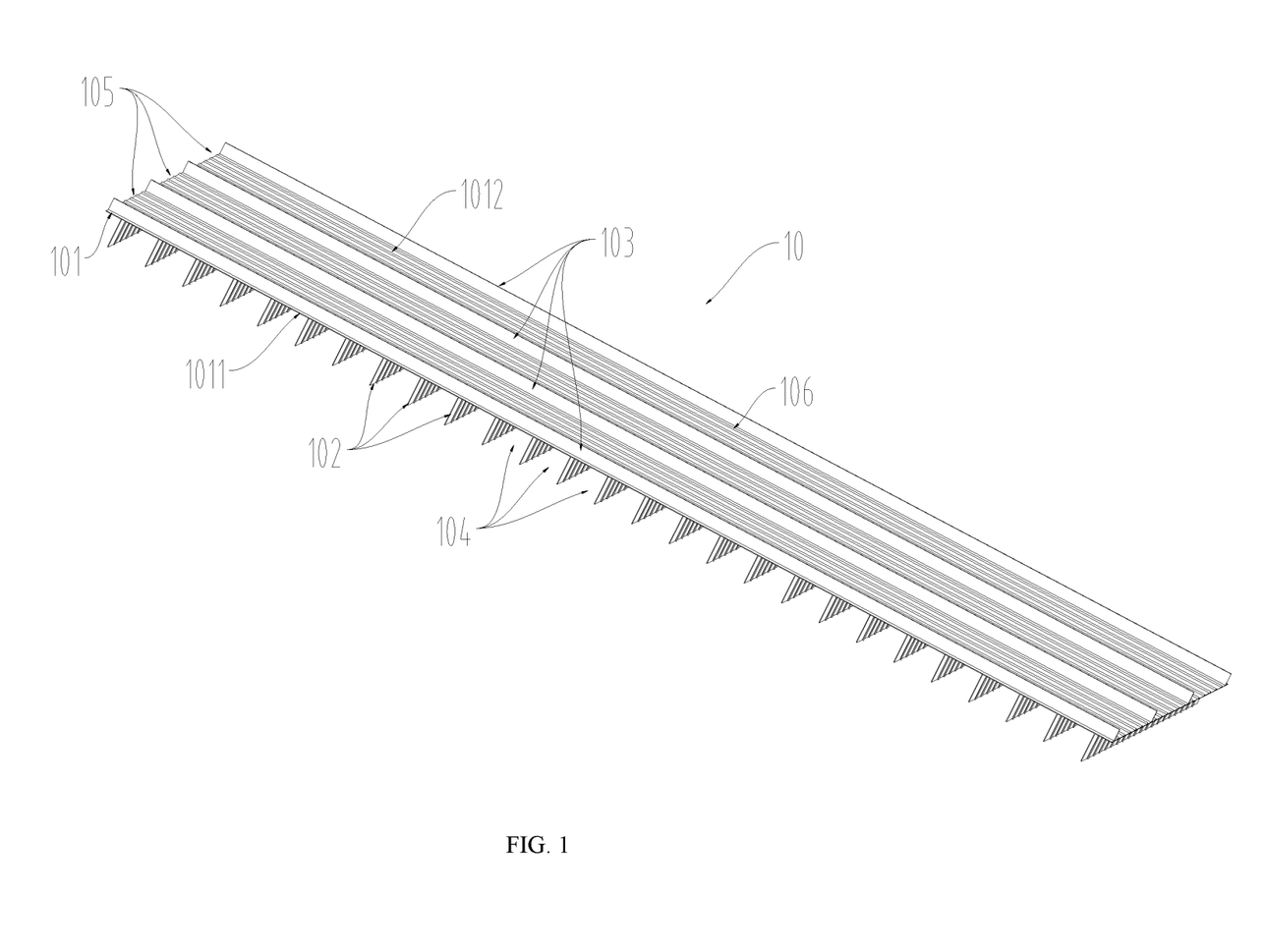
FIG. 1 is a structural diagram of a sedimentation plate according to a specific implementation of the present disclosure.

In the above technical solution of the present disclosure, the plurality of first rib plates 102 and the plurality of second rib plates 103 of the sedimentation plate 10 are perpendicular to the flat plate 101. The first rib plates 102 and the second rib plates 103 can act as reinforcing ribs, which increase the rigidity of the sedimentation plate 10 while reducing the thickness of the sedimentation plate 10. The also design reduces the difficulty of withdrawing during the production of the sedimentation plate 10, thereby improving production efficiency and reducing production costs. When a plurality of sedimentation plates 10 are inclined and stacked in sequence, the mud channel 105 of each sedimentation plate 10 faces obliquely upward and the water channel 104 thereof faces obliquely downward. The first rib plates 102 on the upper sedimentation plate 10 are perpendicular to the mud channel 105 of the lower sedimentation plate 10. Therefore, along a sedimentation direction of sediment, the first rib plates 102 avoid blocking the mud channel 105. The design facilitates direct and rapid sedimentation of the sediment into the mud channel 105, thereby improving settling efficiency and increasing the utilization of the water flow cross-section of the water channel 104. In addition, as for the mud channel 105, the second rib plates 103 stop in the water flow direction to prevent the sediment settled into the mud channel 105 from re-entering the water flow, thereby improving the separation rate between the sediment and water.

In a specific implementation of the present disclosure, a height ratio of the first rib plate 102 to the second rib plate 103 is 1.5-5. The height of the first rib plate 102 and the second rib plate 103 refers to the size of a portion protruding from the flat plate. Preferably, the height ratio of the first rib plate 102 to the second rib plate 103 is 16:9. Thus, the cross-sectional area of the water channel is increased compared to that in the prior art, thereby increasing the water flow rate per unit time and increasing productivity.

In a specific implementation of the present disclosure, the sedimentation plate 10 is made of polyolefin. Specifically, the sedimentation plate can be made of polyvinyl chloride (PVC), polypropylene (PP) or polyethylene (PE). Made of these materials, the sedimentation plate 10 can be molded in one piece by injection molding, and the sedimentation plate 10 is lightweight, facilitating transportation and assembly. In addition, the sedimentation plate 10 made of these materials also has corrosion resistance and long service life.

As shown in FIGS. 1 to 4, an interval between each two adjacent first rib plates 102 is smaller than an interval between each two adjacent second rib plates 103. That is, the mud channel 105 is wider to avoid the mud channel 105 from being clogged by sediment.

As shown in FIG. 1, the second surface 1012 further protrudes to form reinforcing rib 106 that extends parallel to the second rib plate 103 to increase the strength of the sedimentation plate 10 and prevent bending deformation of the sedimentation plate 10 when there is a lot of sediment. The height of the reinforcing rib 106 is less than that of the second rib plate 103 to avoid interference of the reinforcing rib 106 with the water flow in the water channel 104. In addition, the surface of the first rib plate 102 can also form a reinforcing rib perpendicular to the flat plate 101 to prevent bending deformation of the first rib plate 102.

Figure 2:
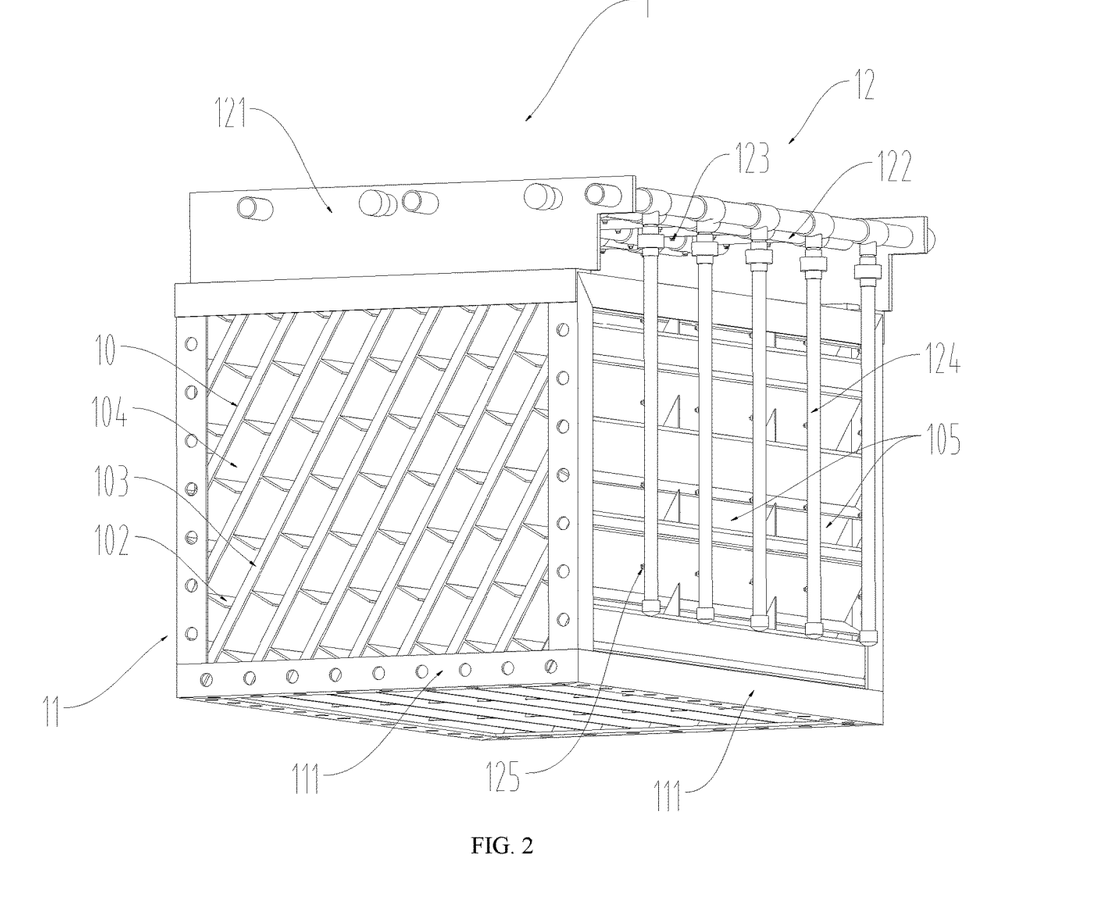
FIG. 2 is an isometric diagram of a sedimentation assembly according to a specific implementation of the present disclosure.
Figure 3:
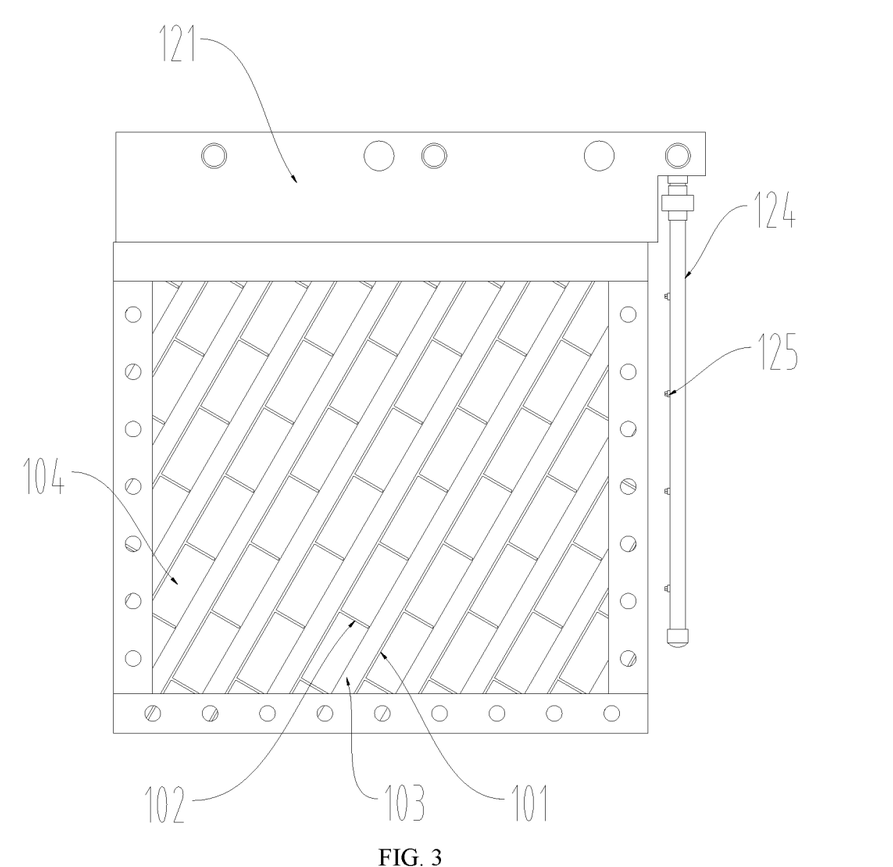
FIG. 3 is a left view of the sedimentation assembly according to a specific implementation of the present disclosure.
Figure 4:
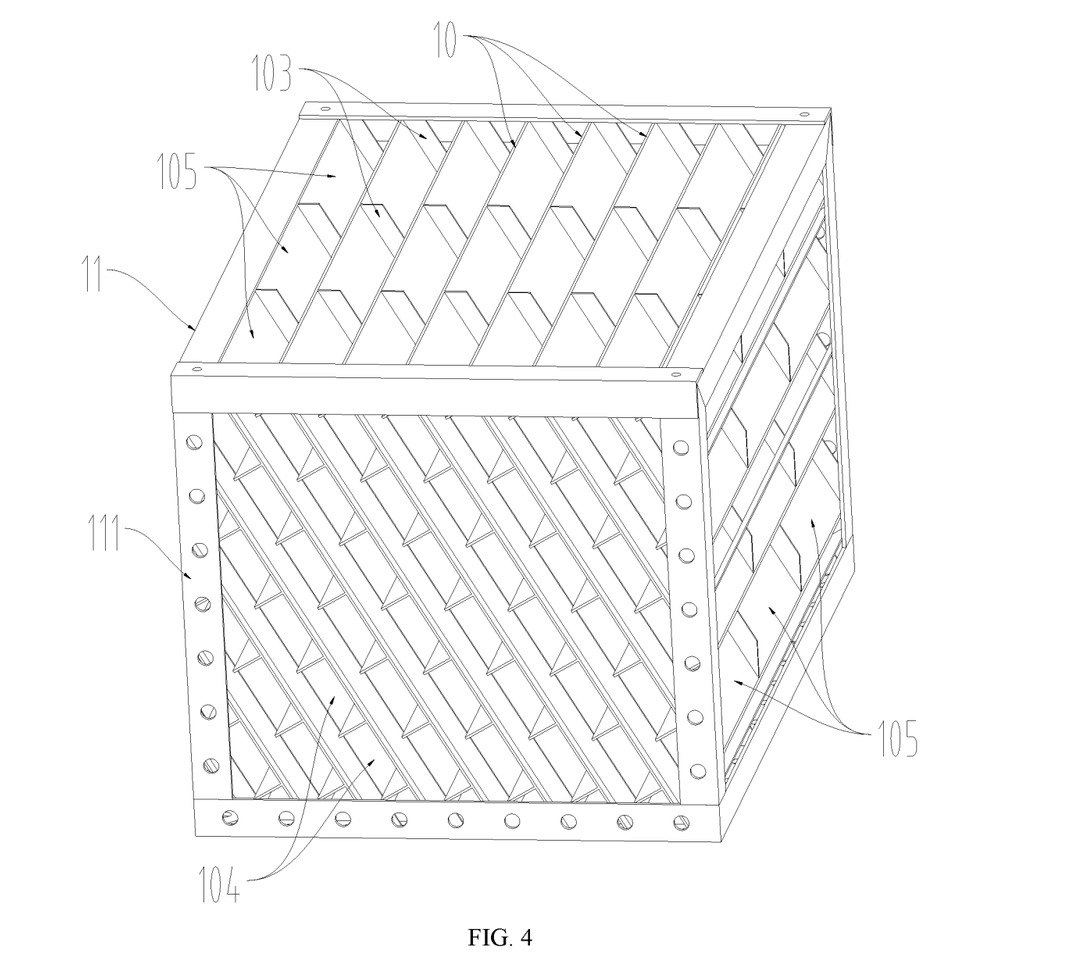
FIG. 4 is an assembly view of the sedimentation plate and a box-type frame according to a specific implementation of the present disclosure.
Figure 5:
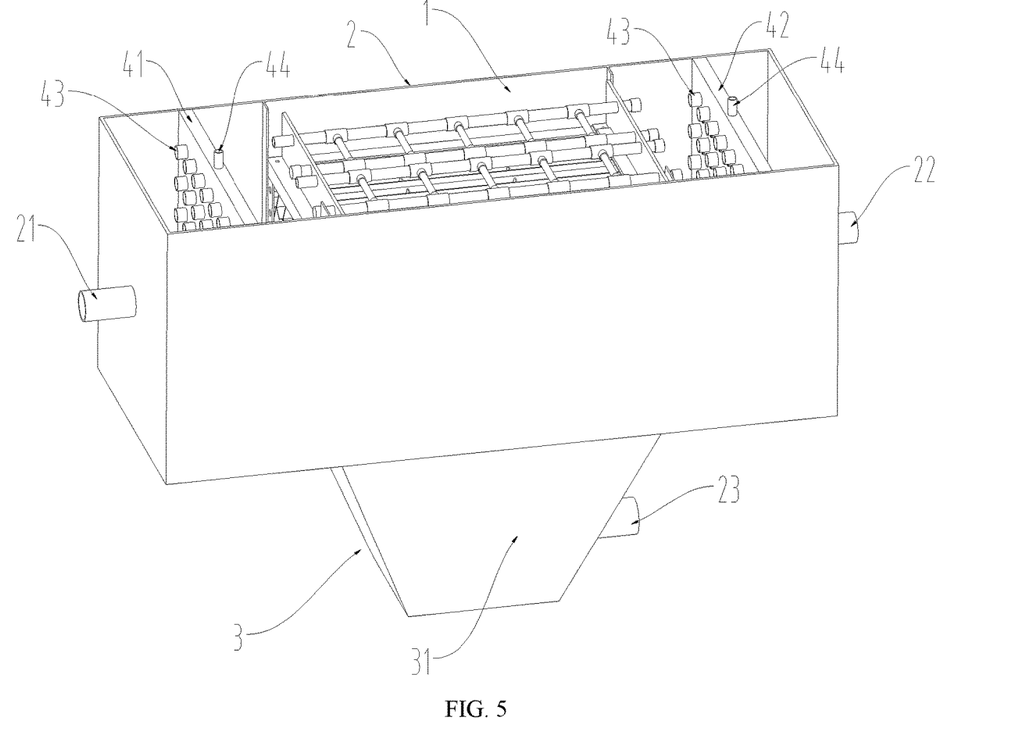
FIG. 5 is an isometric diagram of a sedimentation module according to a specific implementation of the present disclosure.

Based on the above technical solution, the present disclosure further provides sedimentation assembly 1. As shown in FIGS. 2 to 4, the sedimentation assembly 1 includes box-type frame 11 defined by a plurality of side beams 111 and a plurality of sedimentation plates 10 obliquely standing inside the box-type frame 11. The sedimentation plate 10 is the sedimentation plate 10 in the above technical solution. The first surface 1011 faces obliquely downward, and the second surface 1012 faces obliquely upward. For each two adjacent sedimentation plates 10, the first rib plate 102 of one sedimentation plate abuts against the second rib plate 103 of the other sedimentation plate. Thus, as for the adjacent two sedimentation plates 10, the water channel 104 and the mud channel 105 are mutually perpendicular, and the water channel 104 is above the mud channel 105. When water flows through the water channel 104, the sediment is settled into the mud channel 105 under the action of gravity. The mud channel 105 extends obliquely downward, and after entering the mud channel 105, the sediment flows downward and is discharged along the mud channel 105.

Through the technical solution, the sedimentation assembly of the present disclosure has the same technical effect as the sedimentation plate in the above technical solution, which is not described here to avoid unnecessary repetition.

In a specific implementation of the present disclosure, the water flow direction is the same as the extension direction of the water channel 104. Water enters the water channel 104 from a water input side of the sedimentation assembly 1 and flows out of the water channel 104 from a water output side of the sedimentation assembly 1. The sedimentation assembly 1 is approximately a cube structure with a length of 2 m, a width of 3.6 m, and a height of 1.5 m. The length refers to the dimension along the water flow direction. The sedimentation assembly 1 can be used as a standard structure for convenient transportation and installation. In addition, the water flow velocity through the water channel 104 can be 8-10 mm/s to balance settling efficiency and productivity.

In a specific implementation of the present disclosure, an angle between the flat plate 101 and a bottom surface of the box-type frame 11 is 60°, such that an angle between the mud channel 105 and the bottom surface is greater than a dynamic angle of repose of the sediment, thereby preventing the sediment from being adhered to the mud channel 105.

In order to facilitate the assembly operation of the sedimentation assembly 1, at least one of the side beams 111 is provided with a groove (not shown) with an opening inclined to the bottom surface of the box-type frame 11. The sedimentation plate 10 is tightly inserted into the groove and relatively fixed to the box-type frame 11. The sedimentation plate 10 is inserted into the groove to be assembled with the box-type frame 11, which reduces the assembly difficulty of the sedimentation assembly 1 and improves the assembly efficiency of the sedimentation assembly 1. In addition, the side beams 111 are detachably connected by threaded fasteners, facilitating the rapid disassembly and assembly of the box-type frame 11.

Figure 7:
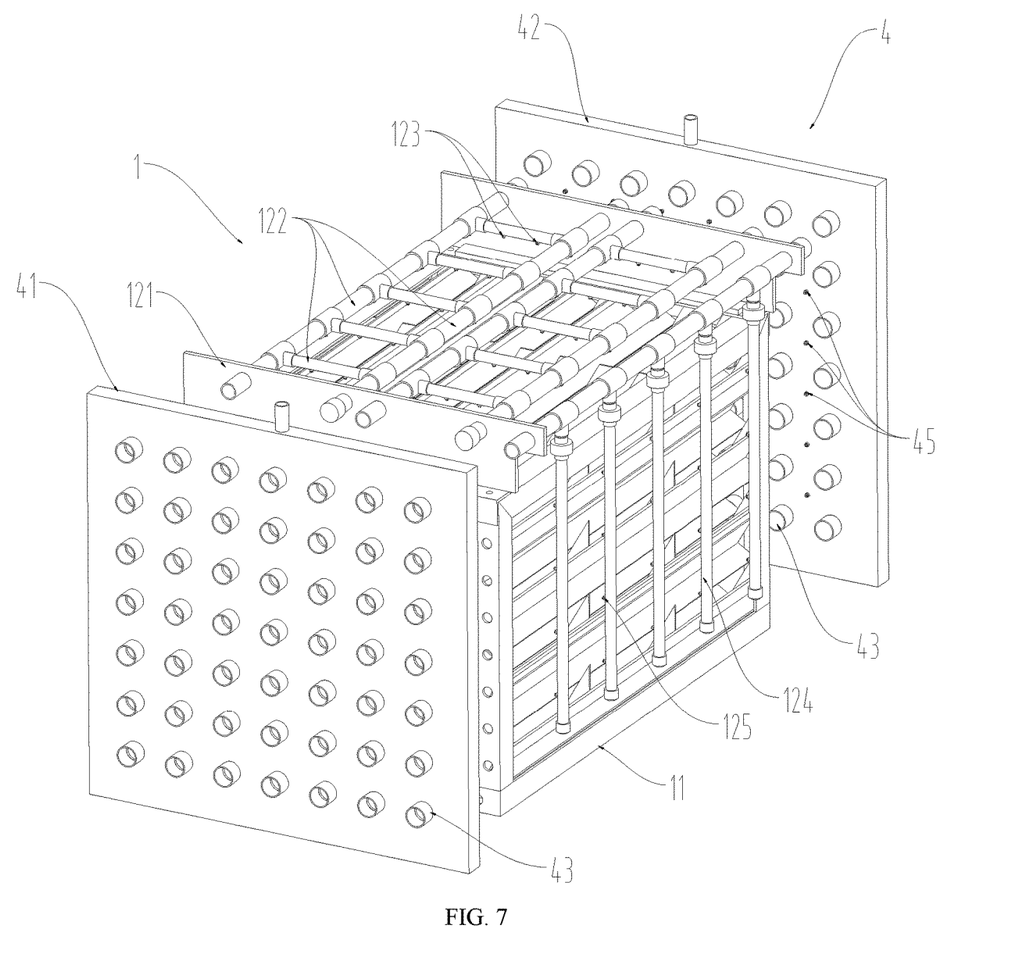
FIG. 7 is an isometric diagram of a water distribution mechanism and the sedimentation assembly according to a specific implementation of the present disclosure.

As shown in FIGS. 2, 3, and 7, the sedimentation assembly 1 further includes flushing mechanism 12 for injecting a flushing liquid into the mud channel 105. The flushing mechanism 12 includes bracket 121 fixed above the side beams 111 and a plurality of first flushing pipes 122 installed on the bracket 121. The first flushing pipes 122 are horizontally arranged and provided with a plurality of first water spray ports 123 opening downward. The plurality of first water spray ports 123 are arranged at intervals. The first flushing pipes 122 are communicated with a high-pressure water source to spray the flushing liquid through the first water spray ports 123 toward the mud channel 105. The flushing liquid flushes the sediment downward as it flows down the mud channel 105, thereby accelerating the discharge of the sediment.

As shown in FIGS. 2, 4, and 7, the sedimentation plates 10 are obliquely standing in the box-type frame 11. Therefore, an upper end of the mud channel 105 of at least one of the sedimentation plates 10 is located on a top surface of the box-type frame 11, while an upper end of the mud channel 105 of at least another sedimentation plate 10 is located on a side surface of the box-type frame 11. Since the first water spray ports 123 cannot spray the cleaning liquid into the mud channel 105 with its upper end located on the side surface of the box-type frame 11. As shown in FIGS. 2 and 7, the flushing mechanism 12 further includes a plurality of second flushing pipes 124 communicated with the first flushing pipes 122. The plurality of second flushing pipes 124 are erected on a side of the box-type frame 11. Specifically, they are erected on the side adjacent to the upper end of the sedimentation plate 10 and provided with second water spray ports 125 facing the sedimentation plate 10. The second water spray ports 125 spray the flushing liquid into the mud channel 105 with its upper end located on the side surface of the box-type frame 11 so as to flush the sediment downward.

Based on the above technical solution, the present disclosure further provides a sedimentation module. As shown in FIGS. 5 to 8, the sedimentation module includes housing 2, sedimentation assembly 1, and sediment handling mechanism 3. The sedimentation assembly 1 is the sedimentation assembly 1 in the above technical solution. The sedimentation assembly 1 is provided inside the housing 2. The housing 2 is provided with water inlet 21, water outlet 22, and mud outlet 23. The water inlet 21 is adjacent to the water input side of the sedimentation assembly 1, the water outlet 22 is adjacent to the water output side of the sedimentation assembly 1, and the mud outlet 23 is provided at a bottom of the housing 2. The sediment handling mechanism 3 is provided below the sedimentation assembly 1 to discharge the settled sediment through the mud outlet 23. Specifically, the sediment handling mechanism 3 is a funnel-shaped structure composed of a plurality of inclined mud guide plates 31. The mud outlet 23 is provided at a bottom of the funnel-shaped structure to facilitate smooth discharge of the sediment.

Through the above technical solution, the sedimentation module provided by the present disclosure has the same technical effects as the sedimentation assembly 1 in the above technical solution, which is not described here to avoid unnecessary repetition. In addition, the sediment discharged from the mud channel 105 to the bottom of the housing 2 is quickly discharged through the mud outlet 23 under the guidance of the sediment handling mechanism 3, preventing the sediment from accumulating in the housing 2 to clog the mud channel 105.

Figure 6:
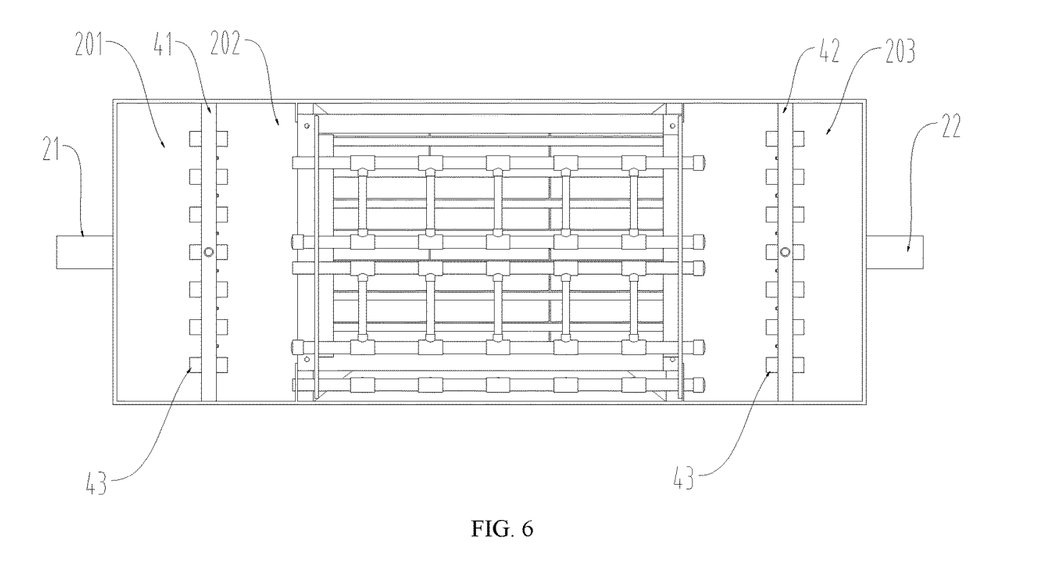
FIG. 6 is a top view of the sedimentation module according to a specific implementation of the present disclosure.

As shown in FIG. 7, the sedimentation module further includes water distribution mechanism 4. As shown in FIGS. 5 to 8, the water distribution mechanism 4 includes first water distribution plate 41 provided between the water input side of the sedimentation assembly 1 and the water inlet 21 and second water distribution plate 42 provided between the water output side of the sedimentation assembly 1 and the water outlet 22. As shown in FIG. 6, the first water distribution plate 41 and the second water distribution plate 42 divide the housing 2 into water input chamber 201, sedimentation chamber 202 accommodating the sedimentation assembly 1, and water output chamber 203. Water distribution pipes 43 are uniformly distributed on the first water distribution plate 41 and the second water distribution plate 42 in a penetrating manner to connect two adjacent chambers. Specifically, the evenly distributed water distribution pipes 43 on the first water distribution plate 41 evenly introduce water from the water input chamber 201 into the sedimentation chamber 202. In this way, the water flow enters a plurality of water channels 104 evenly and stably, ensuring the sedimentation stability. The evenly distributed water distribution pipes 43 on the second water distribution plate 42 evenly and stably introduce water from the sedimentation chamber 202 into the water output chamber 203, such that the settled water is stably and gently discharged through the water outlet 22 to the next process.

Figure 8:
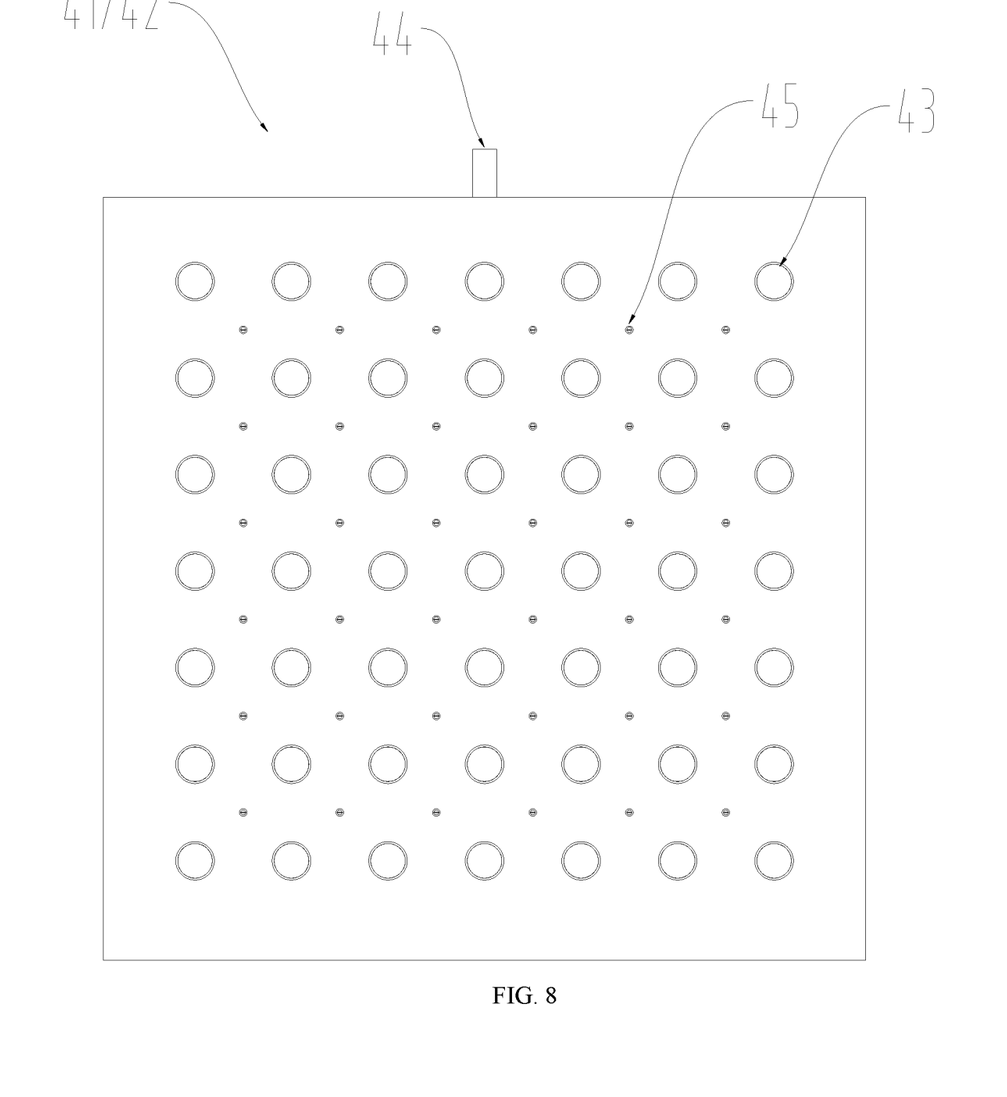
FIG. 8 is a front view of a water distribution plate according to a specific implementation of the present disclosure.

In addition, each of the first water distribution plate 41 and the second water distribution plate 42 is a hollow plate with a cavity (not shown). A surface of each of the first water distribution plate 41 and the second water distribution plate 42 facing the water channel 104 is provided with a plurality of nozzles 44 communicated with the cavity. The positions of the nozzles 44 correspond to the position of the water channel 104. The first water distribution plate 41 and the second water distribution plate 42 are connected to water supply pipe 45 for supplying water to the cavity. The water supply pipe 45 is communicated with a high-pressure water source to spray high-pressure water through the nozzles 44 into the water channel 104 so as to clean the water channel 104.

Preferred implementations of the present disclosure are described above in detail with reference to the drawings, but the present disclosure is not limited to specific details in the above implementations. A plurality of simple variations can be made to the technical solutions of the present disclosure without departing from the technical ideas of the present disclosure, and these simple variations fall within the protection scope of the present disclosure.

In addition, it should be noted that various specific technical features described in the foregoing embodiments can be combined in any suitable manner, provided that there is no contradiction. To avoid unnecessary repetition, various possible combination modes of the present disclosure are not described separately.

In addition, various embodiments of the present disclosure can be combined in any way, and any combined embodiment should also be regarded as the content disclosed in the present disclosure, as long as it does not violate the spirit of the present disclosure.

What is claimed is:
1. A sedimentation assembly, comprising:
   a box-type frame defined by a plurality of side beams and
      a plurality of sedimentation plates obliquely standing
         inside the box-type frame, wherein each sedimentation plate of the plurality of sedimentation plates is used for lateral-flow horizontal sedimentation, and comprises:
a flat plate;
a plurality of first rib plates, arranged at intervals, parallel to each other, and standing on a first surface of the flat plate; and
a plurality of second rib plates, arranged at intervals, parallel to each other, and standing on a second surface of the flat plate;
wherein, the first rib plates and the second rib plates are perpendicular to the flat plate, respectively, the first rib plates are perpendicular to the second rib plates, a water channel is formed between each two adjacent first rib plates, and a mud channel is formed between each two adjacent second rib plates, and wherein the first surface faces obliquely downward, and the second surface faces obliquely upward, and for each two adjacent sedimentation plates, the first rib plate of one sedimentation plate abuts against the second rib plate of the other sedimentation plate.

2. The sedimentation plate according to claim 1, wherein a height ratio of the first rib plate to the second rib plate is 1.5-5.

3. The sedimentation plate according to claim 1, wherein an interval between each two adjacent first rib plates is smaller than an interval between each two adjacent second rib plates.

4. The sedimentation plate according to claim 1, wherein the second surface further protrudes to form a reinforcing rib that extends parallel to the second rib plate; and a height of the reinforcing rib is less than a height of the second rib plate.

5. The sedimentation plate according to claim 1, wherein the sedimentation plate is made of polyolefin.

6. The sedimentation assembly according to claim 1, wherein the sedimentation assembly further comprises a flushing mechanism for injecting a flushing liquid into the mud channel; the flushing mechanism comprises a bracket fixed above the side beams and a plurality of first flushing pipes installed on the bracket; and the first flushing pipes are horizontally arranged and provided with first water spray ports opening downward.

7. The sedimentation assembly according to claim 6, wherein the flushing mechanism further comprises a plurality of second flushing pipes communicated with the first flushing pipes; and the plurality of second flushing pipes are erected on a side of the box-type frame and provided with second water spray ports facing the sedimentation plate.

8. The sedimentation assembly according to claim 7, wherein the second flushing pipes are erected on the side of the box-type frame adjacent to an upper end of the sedimentation plate.

9. The sedimentation assembly according to claim 1, wherein an angle between the flat plate and a bottom surface of the box-type frame is 60°.

10. The sedimentation assembly according to claim 1, wherein at least one of the side beams is provided with a groove with an opening inclined to a bottom surface of the box-type frame; and the sedimentation plate is inserted into the groove.

11. The sedimentation assembly according to claim 1, wherein the side beams are detachably connected by threaded fasteners.

12. A sedimentation module, comprising:
a housing, provided with a water inlet, a water outlet, and a mud outlet;
a sedimentation assembly, constructed as the sedimentation assembly according to claim 1, and provided inside the housing; and
a sediment handling mechanism, provided below the sedimentation assembly to discharge settled sediment through the mud outlet.

13. The sedimentation module according to claim 12, wherein the sedimentation module further comprises a water distribution mechanism, wherein the water distribution mechanism comprises a first water distribution plate provided between a water input side of the sedimentation assembly and the water inlet and a second water distribution plate provided between a water output side of the sedimentation assembly and the water outlet;
the first water distribution plate and the second water distribution plate divide the housing into a water input chamber, a sedimentation chamber accommodating the sedimentation assembly, and a water output chamber; and water distribution pipes are uniformly distributed on the first water distribution plate and the second water distribution plate in a penetrating manner to connect two adjacent chambers.

14. The sedimentation module according to claim 13, wherein each of the first water distribution plate and the second water distribution plate is a hollow plate with a cavity; a surface of each of the first water distribution plate and the second water distribution plate facing the water channel is provided with a plurality of nozzles communicated with the cavity; positions of the nozzles correspond to a position of the water channel; and the first water distribution plate and the second water distribution plate are connected to a water supply pipe for supplying water to the cavity.

15. A sedimentation assembly, comprising a box-type frame defined by a plurality of side beams and a plurality of sedimentation plates obliquely standing inside the box-type frame, wherein the sedimentation plate is the sedimentation plate according to claim 2; and
the first surface faces obliquely downward, and the second surface faces obliquely upward; and for each two adjacent sedimentation plates, the first rib plate of one sedimentation plate abuts against the second rib plate of the other sedimentation plate.

16. A sedimentation assembly, comprising a box-type frame defined by a plurality of side beams and a plurality of sedimentation plates obliquely standing inside the box-type frame, wherein the sedimentation plate is the sedimentation plate according to claim 3; and
the first surface faces obliquely downward, and the second surface faces obliquely upward; and for each two adjacent sedimentation plates, the first rib plate of one sedimentation plate abuts against the second rib plate of the other sedimentation plate.

17. A sedimentation assembly, comprising a box-type frame defined by a plurality of side beams and a plurality of sedimentation plates obliquely standing inside the box-type frame, wherein the sedimentation plate is the sedimentation plate according to claim 4; and
the first surface faces obliquely downward, and the second surface faces obliquely upward; and for each two adjacent sedimentation plates, the first rib plate of one sedimentation plate abuts against the second rib plate of the other sedimentation plate.

18. A sedimentation assembly, comprising a box-type frame defined by a plurality of side beams and a plurality of sedimentation plates obliquely standing inside the box-type frame, wherein the sedimentation plate is the sedimentation plate according to claim 5; and the first surface faces obliquely downward, and the second surface faces obliquely upward; and for each two adjacent sedimentation plates, the first rib plate of one sedimentation plate abuts against the second rib plate of the other sedimentation plate.

19. The sedimentation assembly according to claim 6, wherein an angle between the flat plate and a bottom surface of the box-type frame is 60°.

* * * * *